W. A. RIDDELL.
PHOTGRAPHIC LENS CARRIAGE.
APPLICATION FILED OCT. 15, 1917.
1,295,373.
Patented Feb. 25, 1919.
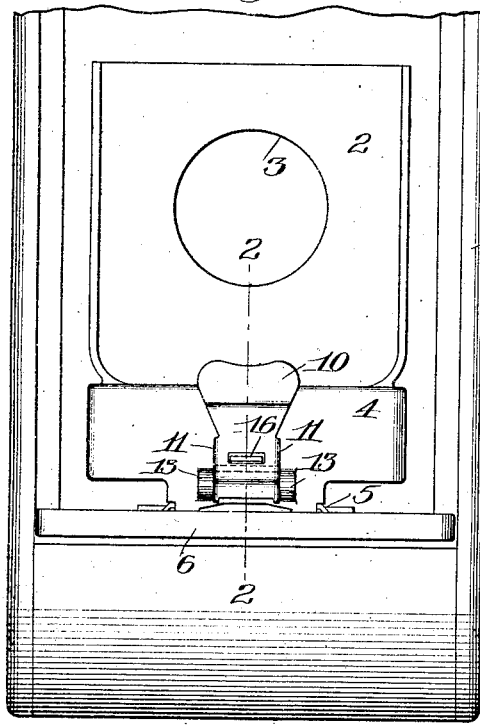
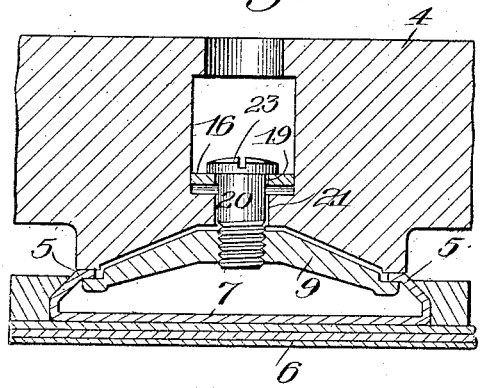
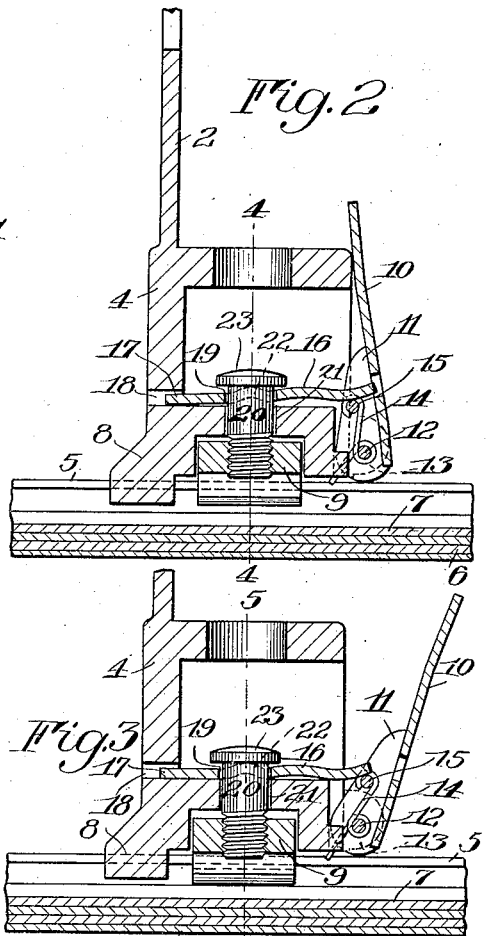
WITNESSES:
Nelson H. Copp
George D. Powell
INVENTOR.
William A. Riddell
BY
his ATTORNEYS.

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC LENS-CARRIAGE.

1,295,373.   Specification of Letters Patent.   Patented Feb. 25, 1919.

Application filed October 15, 1917.   Serial No. 196,563.

*To all whom it may concern:*

Be it known that I, WILLIAM A. RIDDELL, of Rochester, in the county of Monroe and State of New York, have invented certain new and useful Improvements in Photographic Lens-Carriages; and I do hereby declare the following to be a full, clear, and exact description of the same, reference being had to the accompanying drawings, forming a part of this specification, and to the reference-numerals marked thereon.

My present invention relates to photography and more particularly to the focusing devices of cameras and it has for its object to provide a simple, neat and efficient adjusting device and lock for the lens carriage of a bellows camera whereby the operator is offered great convenience in moving the carriage about for the focus and then locking it in the desired position. To these and other ends the invention resides in certain improvements and combinations of parts all as will be hereinafter more fully described, the novel features being pointed out in the claims at the end of the specification.

In the drawings:

Figure 1 is a fragmentary front elevation of a folding camera provided with a front and lens carriage constructed in accordance with and illustrating one embodiment of my invention;

Fig. 2 is an enlarged fragmentary sectional view through the lens carriage taken substantially on the line 2—2 of Fig. 1 and showing the carriage locked to the bed;

Fig. 3 is a similar view showing the positions of the parts when the clamp or lock is released;

Fig. 4 is a fragmentary section on the line 4—4 of Fig. 2, and

Fig. 5 is a similar section on the line 5—5 of Fig. 3.

Similar reference numerals throughout the several figures indicate the same parts.

In the accompanying drawings I have not shown all of the general features of camera construction for the reason that the relationship of a camera body, its bellows, front and bed and the workings of the combination are too well known in the art to require the description of a complete camera. With this understanding, 1 indicates the camera body and 2 the front having the central opening 3 to receive the lens and lens board. The front 2 is mounted on a carriage block 4 movable on tracks 5 on the camera bed 6. The tracks are constituted, in the present instance, by inwardly turned lateral flanges on a plate 7. The carriage block 4 rests on the track except for rearward lugs 8 which are grooved to engage the tracks both above and below. Forwardly of these lugs the track is spanned by a cross head 9 the ends of which engage on the under side of the track and when the cross head is drawn upwardly it clamps the track between it and the carriage block and locks the latter in place, as shown in Fig. 4. When it is released or lowered, as in Fig. 5, the carriage block 4 is free to slide along the track.

The carriage may be manipulated back and forth by a vertically swinging handle or finger-piece 10 which preferably consists of a broad plate or ear having rearwardly turned flanges 11 by which it is pivoted on a pintle 12 mounted in lugs 13 on the carriage block. A spring 14 coiled about the pintle 12 and having one end acting against the carriage block 4 engages at the other end a bar 15 also carried by the flanges 11 and this spring acts to move the handle 10 to an upright or partially folded position, as shown in Fig. 2. When swung to this position, the bar 15 on the handle piece engages beneath the cam faced end of a resilient lever 16 extending from front to rear of the carriage. The rear end has an anchoring finger 17 stepped into a recess 18 in the rear of the carriage block. The center of the lever is perforated at 19 to receive a stem 20 on the cross head 9 which stem works vertically in an aperture 21 in the center of the carriage and a slightly raised portion 22 on the lever in the region of the perforation engages beneath a head 23 on the stem 20. Thus, as the handle 10 reaches the said vertical position of Fig. 2, the lever is raised and placed under tension drawing up the stem 20 and clamping the cross head 9 against the track so that the carriage is locked in position. When the handle 10 is drawn forwardly again, as in Fig. 3, the bar 15 rides out from beneath the spring lever 16, relieving the tension thereon and permitting a lowering of the stem 20 so that the cross head 9 disengages from the track 5 as in Fig. 5. The carriage may then be drawn forward or pushed back by means of the handle 10 which is never allowed to drop down upon the track because of the spring 14 which holds it in a convenient inclined position ready for the grasp of the operator's fingers. The spring 14 is not of sufficient strength to place the lever 16 under tension.

It will be observed that the clamp is released automatically by that forward movement of the lever 10 which naturally develops as the operator reaches into the folded camera to draw out the front and requires no extra motion. In locking the carriage, the bar 15 is so placed in rear of the pivot 12 of the handle that the reaction of the spring lever 16 tends to maintain the handle in the folded position of Fig. 2. It will also be noted that the parts do not require any nice adjustment in assembling as the resiliency of the lever 16 compensates for any slight inaccuracies that may occur in the relative positions of the pivot 12, bar 15, lever 16 and head 23 of the cross-head stem.

I claim as my invention:

1. In a camera, the combination with a track, and a lens carriage movable thereon, of a clamp for locking the carriage to the track, a resilient lever for communicating spring pressure to the clamp and means for placing the lever under tension.

2. In a camera, the combination with a track and a lens carriage movable thereon, of a vertically movable clamping device on the carriage, a vertically swinging operating handle pivoted at the front of the carriage and having rearwardly turned side flanges, and a member connecting said side flanges and adapted to engage the clamping device to move it vertically.

3. In a camera, the combination with a track and a lens carriage movable thereon having forwardly projecting lugs, of a vertically movable clamping device on the carriage and a vertically swinging operating handle pivoted between the lugs on the carriage and coöperating with the clamping device to move it vertically.

4. In a camera, the combination with a track and a lens carriage movable thereon, of a clamp for locking the carriage to the track, a forwardly projecting resilient lever for communicating pressure to the clamp, a vertically swinging operating handle for the carriage having a forward operative position and a rearward inoperative position and an abutment on the operating member adapted to engage the lever in the last mentioned position and place said lever under tension, the latter in turn operating to hold the member in its rearward position.

5. In a camera, the combination with a track and a lens carriage movable thereon, of a cross head below the carriage adapted to engage beneath the track, a headed stem on the cross head extending through the carriage, a perforated spring lever engaging beneath the head of the stem and a pivoted member adapted to engage beneath the lever and place it under tension.

6. In a camera, the combination with a track and a lens carriage movable thereon, of a spring clamp for locking the carriage on the track and a pivoted handle for operating the carriage movable forwardly to disengage the clamping device and rearwardly to engage it, the clamping device in turn acting to engage the handle with downward pressure in rear of its pivot and maintain the handle in said rearward position.

WILLIAM A. RIDDELL.

Witnesses:
 HELEN M. FRASER,
 MARGARET DUIGNAN.

Copies of this patent may be obtained for five cents each, by addressing the "Commissioner of Patents, Washington, D. C."